(12) United States Patent
Matsuda et al.

(10) Patent No.: US 10,796,034 B2
(45) Date of Patent: *Oct. 6, 2020

(54) SIMULATION APPARATUS, SIMULATION METHOD, AND SIMULATION PROGRAM RELATING TO RADIATION HEAT TRANSPORT PHENOMENON

(71) Applicant: JAPAN AGENCY FOR MARINE-EARTH SCIENCE AND TECHNOLOGY, Kanagawa (JP)

(72) Inventors: Keigo Matsuda, Kanagawa (JP); Keiko Takahashi, Kanagawa (JP)

(73) Assignee: JAPAN AGENCY FOR MARINE-EARTH SCIENCE AND TECHNOLOGY, Kanagawa (JP)

( * ) Notice: Subject to any disclaimer, the term of this patent is extended or adjusted under 35 U.S.C. 154(b) by 398 days.

This patent is subject to a terminal disclaimer.

(21) Appl. No.: 15/036,820

(22) PCT Filed: Nov. 14, 2014

(86) PCT No.: PCT/JP2014/080198
§ 371 (c)(1),
(2) Date: May 16, 2016

(87) PCT Pub. No.: WO2015/072546
PCT Pub. Date: May 21, 2015

(65) Prior Publication Data
US 2016/0267206 A1    Sep. 15, 2016

(30) Foreign Application Priority Data
Nov. 14, 2013 (JP) .................................. 2013-236190

(51) Int. Cl.
*G06F 30/20* (2020.01)
*G06F 17/13* (2006.01)
*G06F 119/08* (2020.01)

(52) U.S. Cl.
CPC .............. *G06F 30/20* (2020.01); *G06F 17/13* (2013.01); *G06F 2119/08* (2020.01)

(58) Field of Classification Search
CPC .... G06F 17/5009; G06F 17/13; G06F 221/80; G06F 30/20
See application file for complete search history.

(56) References Cited

U.S. PATENT DOCUMENTS

2010/0305916 A1* 12/2010 Takahashi ............... G01W 1/10
                                                                703/2
2010/0305917 A1* 12/2010 Takahashi ............... G01K 7/42
                                                                703/2

FOREIGN PATENT DOCUMENTS

JP    2003-099697 A    4/2003
JP    2012/021684 A    2/2012
(Continued)

OTHER PUBLICATIONS

Akashi Mochida, Satoru Iizuka, Yoshihide Tominaga, Isaac Yu-Fat Lun, Up-scaling CWE models to include mesoscale meteorological influences, The Fifth International Symposium on Computational Wind Engineering (CWE2010) Chapel Hill, North Carolina, USA May 23-27, 2010 (Year: 2010).*

(Continued)

*Primary Examiner* — Rehana Perveen
*Assistant Examiner* — Chuen-Meei Gan
(74) *Attorney, Agent, or Firm* — Marshall, Gerstein & Borun LLP

(57) ABSTRACT

A simulation apparatus includes: a view factor calculation means for calculating a view factor related to each two elements in a virtual three-dimensional space that is defined by a plurality of surface elements and a plurality of volume elements, the view factor calculation means calculating, as a view factor related to two element including one or two elements, a view factor decreased by a value corresponding (Continued)

to a quantity of radiation heat passing through the one or two volume elements; and a radiation heat quantity calculation means for calculating a radiation heat quantity exchanged between each two elements using each view factor calculated by the view factor calculation means, and the three-dimensional space of the simulation device is defined so that a plurality of trees in the three-dimensional space are treated as the plurality of volume elements.

5 Claims, 5 Drawing Sheets

(56) References Cited

FOREIGN PATENT DOCUMENTS

| | | |
|---|---|---|
| JP | 5137039 B2 | 2/2013 |
| WO | WO-2009/057189 A1 | 5/2009 |

OTHER PUBLICATIONS

Emmanuel Bozonnet et al, Modeling methods to assess urban fluxes and heat island mitigation measures from street to city scale, International Journal of Low-Carbon Technologies 2015, 10, 62-77 (Year: 2013).*

Narita, Ken-ichi, Sugawara, Hirofumi, Honjo, Tsuyosi, Effects of roadside trees on the thermal environment within a street canyon, Geographical Reports of Tokyo Metropolitan University(43): 41-48 (Year: 2008).*

William R. Herb, Ben Janke, Omid Mohseni, Heinz G. Stefan, Ground surface temperature simulation for different land covers, Journal of Hydrology (2008) 356, 327-343 (Year: 2008).*

Hiroyuki Kusaka et al, A Simple Single-Layer Urban Canopy Model for Atmosphericmodels: Comparisonwith Multi-Layer and Slab Models, Boundary-Layer Meteorology 101: 329-358, 2001. (Year: 2001).*

Christopher P. Loughner et al, Roles of Urban Tree Canopy and Buildings in Urban Heat Island Effects: Parameterization and Preliminary Results, 2012 American Meteorological Society, Journal of Applied Meteorology and Climatology vol. 51 (Year: 2012).*

Sakurai, Atsushi, Tae-Ho Song, Shigenao Maruyama, and Hyun Keol Kim. "Comparison of radiation element method and discrete ordinates interpolation method applied to three-dimensional radiative heat transfer." JSME International Journal Series B Fluids and Thermal Engineering 48, No. 2 (2005): 259-264. (Ye.*

Lee, Sang-Hyun, and Soon-Ung Park. "A vegetated urban canopy model for meteorological and environmental modelling." Boundary-Layer Meteorology 126, No. 1 (2008): 73-102. (Year: 2008).*

Matsuda, Keigo, Ryo Onishi, Satoshi Yamada, Hiroaki Yamato, Mikiko Ishikawa, and Keiko Takahashi. "Numerical analysis of heat environment in central Tokyo using tree-crown-resolving large-eddy simulation considering three-dimensional radiation process." In 9th int. conf. urban clim.2015. (Year: 2015).*

Shinzato, Paula, and Denise Duarte. "Microclinnatic effect of vegetation for different leaf area index-LAI." Passive and Low Energy Architecture, Lima (2012). (Year: 2012).*

Bruse, Michael. "ENVI-met 3.0: updated model overview." University of Bochum. Retrieved from: www. envi-met.com (2004). (Year : 2004).*

Yoshida et al., "Development of New Plant Canopy Model for Coupled Simulation of Convection, Radiation and Moisture Transport", Monthly Journal of Institute of Industrial Science, Seisan Kenkyu, University of Tokyo, vol. 51, No. 1, 1999.01, pp. 11-16 with a partial translation Partial translation.

Aya Hagishima, "Numerical Analysis on Cooling Effect of a Row of Trees in an Urban Canyon", Journal of Architecture, Planning and Environmental Engineering, No. 525, Nov. 30, 1999, pp. 83-90.

Yoshida et al., "Study on Effect of Greening on Outdoor Thermal Environment Using Three Dimensional Plant Canopy Model", J. of Archi. Plann. Environ. Engng., No. 536, 2000, pp. 87-94.

Sakamoto et al., "Numerical Analysis of the Cool-Spot Effect of Trees Using CFD: Part 1: Numerical Model for Radiation and Evapotranspiration of Trees", Summaries of Technical Papers of Annual Meeting Architectural Institute of Japan, D-1, 2005, pp. 689-690 with a partial translation.

Kojima et al., "Numerical Analysis of the Cool-Spot Effect of Trees Using CFD: Part 2: Case Studies of the Cool-Spot Effect", Summaries of Technical Papers of Annual Meeting Architectural Institute of Japan, D-1, 2005, pp. 691-692 with a partial translation.

Oguro et al., "Development of Heat Island Analysis and Assessment System for Buildings and Building Blocks", Report of Taisei Technology Center, No. 38, 2005, pp. 14-1-14-8, with a partial translation.

Oguro et al., "Development of Heat Island Analysis and Assessment System for Buildings and Building Blocks: Outline of the Program and Analysis Example of Future Eco-City", Report of Taisei Technology Center, No. 38, No. 42, 2009, pp. 49-1-49-8, with a partial translation.

Kataoka et al., "Development of Numerical Evaluation System for Outdoor Thermal Environment: Canopy Model for Cooling Effect by Trees", Summaries of Technical Papers of Annual Meeting Architectural Institute of Japan, D-1, 2008, pp. 927-928, with a partial translation.

Kiyoshi Sasaki, "Numerical Analyses of the Influence of Roadside Trees on Thermal Environments and Air Quality Within Street Canyon", Technical Research Report of Shimizu Construction Co., Ltd., No. 85, 2007, pp. 41-50.

Rijal et al., "Heat Island Mitigation Effect of the Large Scale Green Area Using Numerical Simulation", Seisan Kenkyu, vol. 62, No. 1, 2010, pp. 54-61, English abstract only.

Search Report in International Application No. PCT/JP2014/080198 dated Dec. 9, 2014, 2 pages.

International Preliminary Report on Patentability and Written Opinion in International Application No. PCT/JP2014/080198 dated May 17, 2016, 6 pages.

Office Action in Chinese Application No. 201480062470.9 dated Nov. 3, 2017, 17 pages.

Yafeng Gao, "Research on Outdoor Terminal Environment Field Test and Simulation Adapted to Urban Residential Planning", Engineering Science and Technology II, China Doctoral Dissertations Full-text Database, Issue No. 1, C038-7, Jan. 15, 2012, 24 pages.

Borong Lin, "Research of Influences on Outdoor Thermal Environment by Greening", Engineering Science and Technology II, China Doctoral Dissertations Full-text Database, Issue No. 3, C038-3, Mar. 15, 2005, 31 pages.

Office Action for CN Application No. 201480062470.9 dated Sep. 18, 2018.

"A Study of the Calculation on the Synthetical Angle Coefficient Between the Square Billets in Walking Beam Furnace", Shengli Qi, Industrial Heating, Issue No. 2, dated Dec. 31, 1996.

Third Office Action for CN Application No. 201480062470.9 dated May 5, 2019.

* cited by examiner

SIMULATION APPARATUS, SIMULATION METHOD, AND SIMULATION PROGRAM RELATING TO RADIATION HEAT TRANSPORT PHENOMENON

TECHNICAL FIELD

The present invention relates to a simulation apparatus, a simulation method and a simulation program relating to radiation heat transport phenomenon.

BACKGROUND ART

Phenomenon that air temperature of urban area is larger than that of its surrounding is called urban heat island phenomenon. As measures for relieving urban heat island phenomenon, planting street trees and developing green spaces are watched with interest. Therefore, there have been developed various simulation techniques (see Patent Literature 1 and Non-Patent Literature 1-9) for simulating radiation heat transport in urban area taking into consideration the layout of street trees and the like.

However, in the existing simulation techniques, simplification of radiation energy transferring process is made such as "heat diffusing by the canopies is ignored, and only attenuation and adsorption of the canopies are considered" in order to reduce computing costs (computational complexity). Therefore, in the existing simulation technology, there are many cases where quantity of the radiation energy absorbed near and/or within the canopies cannot be suitably simulated.

CITATION LIST

Patent Literature 1: Japanese Laid-Open Patent Document No. 2003-099697
Patent Literature 2: Japanese Patent No. 5137039
Patent Literature 3: Japanese Laid-Open Patent Document No. 2012-021684
Non-Patent Literature 1: Shinji Yoshida, Shuzo Murakami, Mochida Akashi, Ooka Ryozo, Yoshihide Tominaga, "Development of New Plant Canopy Model for Coupled Simulation of Convection, Radiation and Moisture Transport", SEISAN KENKYU Vol. 51, No. 1, 1999
Non-Patent Literature 2: Shinji Yoshida, Ryozo Ooka, Akashi Mochida, Yoshihide Tominaga, Shuzo Murakami, "Study on effect of greening on outdoor thermal environment using three dimensional plant canopy model", J. of Archi. Plann. Environ. Engng. 536, pp. 87-94, 2000
Non-Patent Literature 3: Yuzo Sakamoto, Etsushi Kojima, Yasunobu Ashie, Masashi Imano, "Numerical Analysis of the Cool-Spot Effect of Trees Using CFD: Part 1: Numerical Model for Radiation and Evapotranspiration of Trees", Summaries of technical papers of Annual Meeting Architectural Institute of Japan, D-1, pp. 689-690, 2005
Non-Patent Literature 4: Etsushi Kojima, Yuzo Sakamoto, Yasunobu Ashie, Masashi Imano, "Numerical Analysis of the Cool-Spot Effect of Trees Using CFD: Part 2: Case Studies of the Cool-Spot Effect", Summaries of technical papers of Annual Meeting Architectural Institute of Japan, D-1, pp. 691-692, 2005
Non-Patent Literature 5: Masayuki Oguro, Yasushige Morikawa, "Development of Heat Island Analysis and Assessment System for Buildings and Building Blocks", Report of Taisei Technology Center, No. 38, pp. 14-1-14-8, 2005
Non-Patent Literature 6: Masayuki Oguro, Yasushige Morikawa, Hinako Motohashi, "Development of Heat Island Analysis and Assessment System for Buildings and Building Blocks: Outline of the Program and Analysis Example of Future Eco-City", Report of Taisei Technology Center, No. 38, No. 42, pp. 49-1-49-8, 2009
Non-Patent Literature 7: Hiroto Kataoka, Kiyotoshi Otuska, Hiroyuki Akagawa, "Development of numerical evaluation system for outdoor thermal environment: Canopy model for cooling effect by trees", Summaries of technical papers of Annual Meeting Architectural Institute of Japan, D-1, pp. 927-928, 2008
Non-Patent Literature 8: Kiyoshi Sasaki, "Numerical Analyses of the Influence of Roadside Trees on Thermal Environments and Air Quality Within Street Canyon", Technical research report of Shimizu Construction Co., Ltd., No. 85, pp. 41-50, 2007
Non-Patent Literature 9: H. B. Rijal, Ryozo Ooka et al., "Heat island mitigation effect of the large scale green area using numerical simulation", SEISAN KENKYU, Vol. 61, No. 1, 2010

SUMMARY OF INVENTION

Technical Problem

An object of the present invention is to provide a technique capable of satisfactorily simulating a radiation heat transport phenomenon in a three-dimensional space including canopies at low computing costs.

Solution to Problem

To accomplish the above object, a simulation apparatus for simulating a radiation heat transport phenomenon, is constituted as an apparatus comprising:
a view factor calculation means for calculating a view factor related to each two elements in a virtual three-dimensional space that is defined by a plurality of surface elements and a plurality of volume elements, the view factor calculation means calculating, as a view factor related to two element including one or two elements, a view factor decreased by a value corresponding to a quantity of radiation heat passing through the one or two volume elements; and
a radiation heat quantity calculation means for calculating a radiation heat quantity exchanged between each two elements using each view factor calculated by the view factor calculation means,
wherein the three-dimensional space is defined by the plurality of surface elements and the plurality of volume elements in such a manner that a plurality of trees in the three-dimensional space are treated as the plurality of volume elements.

Namely, the simulation apparatus of the present invention treats each canopy as one or more volume elements having permeability, and calculates, as a view factor related to one surface element and one volume element, a view factor decreased by a value corresponding to a quantity of radiation heat passing through the one volume elements. Further, the simulation apparatus calculates, as a view factor related to two volume elements, a view factor decreased by a value corresponding to a quantity of radiation heat passing through the two volume elements. Therefore, according to the simulation apparatus of the present invention, it is possible to satisfactorily simulating a radiation heat transport phenomenon in a three-dimensional space including canopies in such a manner that calculation of states in each canopy is not required (in other words, at low computing costs).

The present invention can be realized as a simulation method having the same feature as the above simulation apparatus, or a program that makes an information processing apparatus (a computer) function as the above simulation apparatus. Further, the present invention can be realized as a computer-readable medium in which the simulation program is stored.

Effects of the Invention

According to the present invention, it is possible to satisfactorily simulating a radiation heat transport phenomenon in a three-dimensional space including canopies at low computing costs.

DESCRIPTION OF THE EMBODIMENTS

A mode for carrying out the present invention will hereinafter be described with reference to the drawings. It should be noted that the following discussion of the embodiment is an example, and the present invention is not limited to the embodiment.

Figure 1:
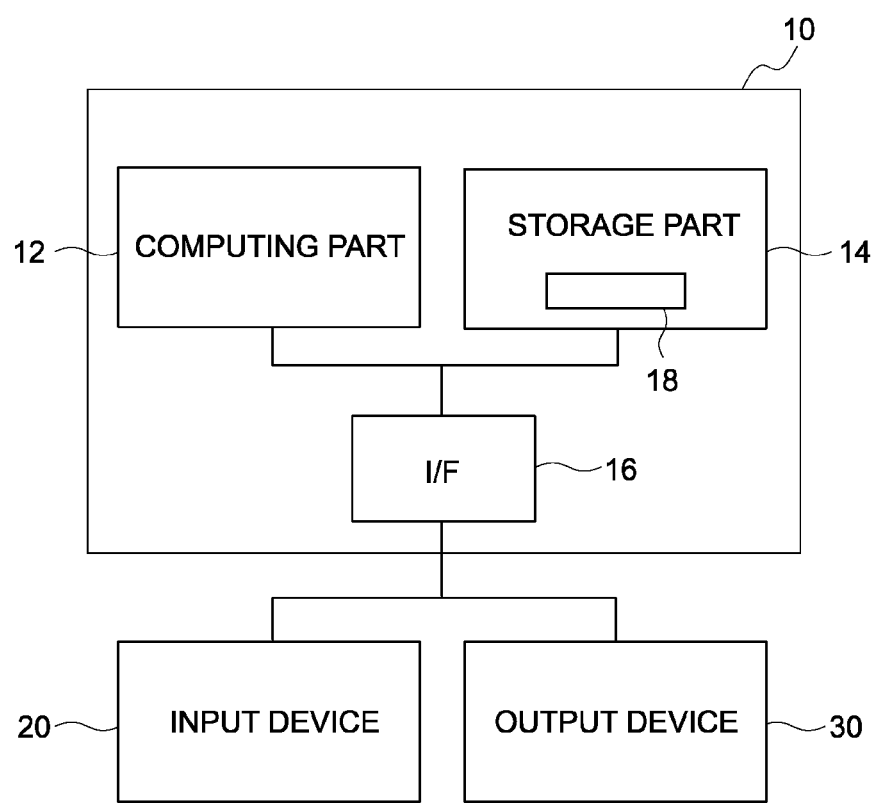
FIG. 1 is a block diagram of a simulation system according to an embodiment of the present invention.

FIG. 1 illustrates a constitution of a simulation system according to an embodiment. As illustrated, the simulation system according to the present embodiment includes a simulation apparatus 10, an input device 20 and output device 30. Further, the simulation apparatus 10 includes a computation part 12, a storage part 14, an interface circuit (I/F) 16.

The interface circuit (I/F) 16 of the simulation apparatus 10 is a circuit that is used by the computation part 12 to communicate with other devices. The storage part 14 is a nonvolatile storage device in which a simulation program 18 is stored. The storage part 14 is also used for storing data that is used by the computation part 12 and processing results by the computation part 12.

The computation part 12 is a unit in which a CPU (Central Processing Unit), a RAM (Random Access Memory), etc. are combined. The computation part 12 performs various processing (described in detail later) by reading the simulation program 18 from storage part 14 and executing it. Further, the computation part 12 functions as the view factor calculation means, the radiation heat calculation means and the temperature calculation means of the present invention by executing the simulation program 18.

The input device 20 is a device for inputting information into the simulation apparatus 10. The input device 20 includes one or more pointing devices such as a keyboard, a mouse, etc. Further, the output device 30 is a display, such as LCD (Liquid Crystal Display) or CRT (Cathode-Ray Tube), a printer or the like, for outputting information from the simulation apparatus 10.

Here, the simulation apparatus 10 is usually realized by making a computer (a vector-type parallel computer, etc.) which can perform matrix operation at a high speed execute the simulation program 18. Therefore, an input device and an output device of a terminal computer connected to the simulation apparatus 10 (a vector model parallel computer, or the like) usually function as the input device 20 and the output device 30.

A function of simulation apparatus 10 is now described.

The simulation apparatus 10 is for simulating a radiation heat transport phenomenon in an urban space (which will hereinafter be called a simulation target space) including trees.

Figure 2:
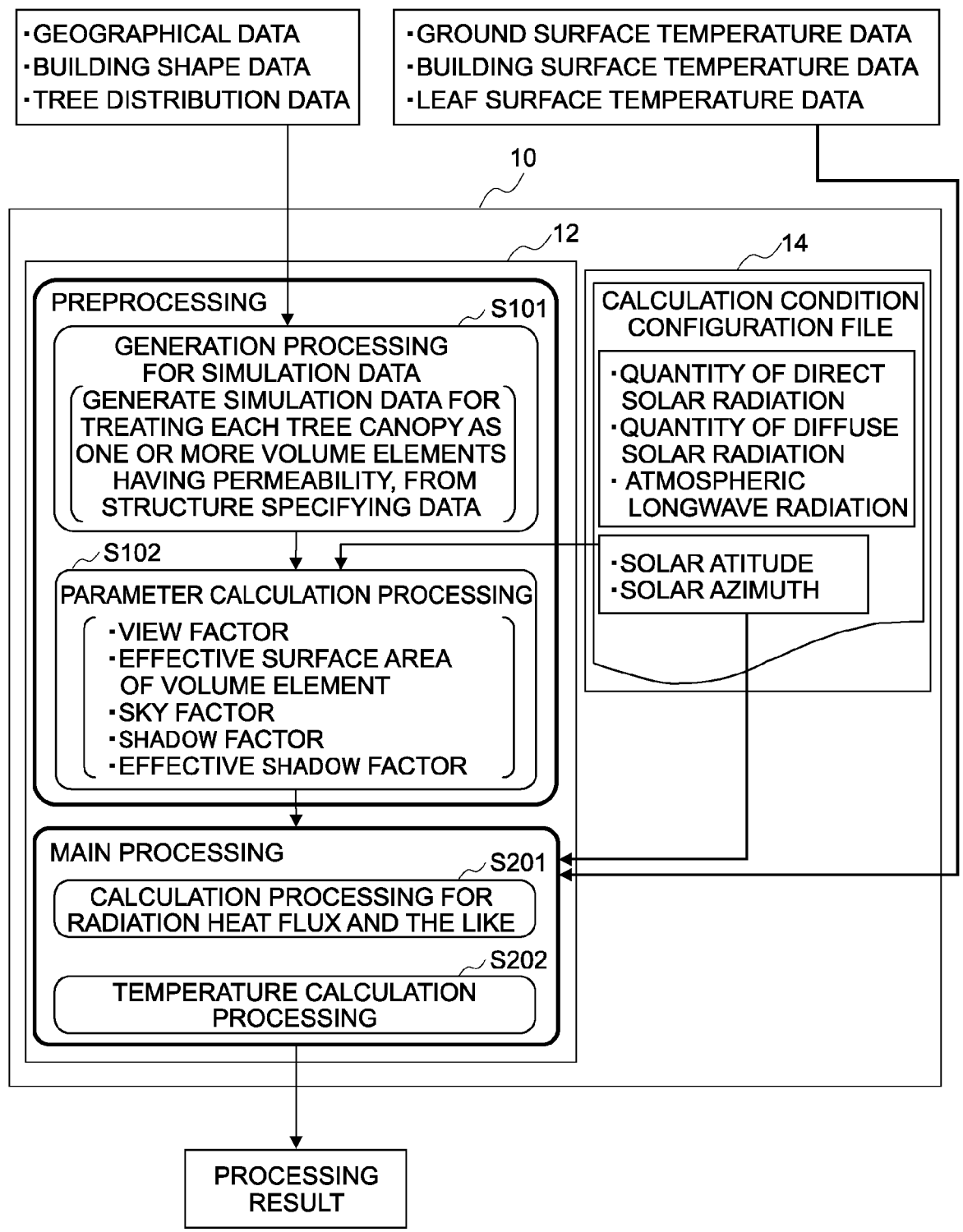
FIG. 2 is an explanatory diagram for function of the simulation system according to an embodiment of the present invention.

As schematically illustrated in FIG. 2, when using the simulation apparatus 10, a calculation condition file, in which information relating to solar attitudes and azimuths in a simulation target time range and other information are set, is stored in the storage part 14. Further, topographical data, building shape data, tree distribution data, ground surface temperature data, building surface temperature data and leaf surface temperature data are input into the simulation apparatus 10.

The topographical data is data representing topography (shape of the ground) of the simulation target space. The building surface temperature data is data representing position and shape of each building in the simulation target space. The lead surface temperature data is data representing position, shape and leaf area density distribution of each tree in the simulation target space.

These data can be any data as long as structure (three-dimensional urban shape and three-dimensional tree distribution) of the simulation target space can be recognized from them. Therefore, it is possible to use, as the topographical data or building shape data, data including two-dimensional plane data of heights of ground/building (data representing a correspondence between heights of ground points or buildings and their coordinates), for example. Further, it is possible to use, as tree distribution data, data including two-dimensional plane data of tree indexes (identifying information of the tree) and data representing the vertical distribution of the leaf area density of each tree identified by each tree index.

The ground surface temperature data, the building surface temperature data, and the leaf surface temperature data are data representing initial value of temperature of each point on the ground, data representing initial value of temperature of each part of each building surface, and initial value of temperature of leaf surface at each location.

A content of processing that the simulation apparatus 10 (the computation part 12) carries out will be explained. Note that the topographical data, the building shape data and the tree distribution data that are input into the simulation apparatus 10 will hereinafter be referred to as structure specifying data.

The simulation apparatus 10 is basically an apparatus that simulates temperature of each part in the simulation target space at every $\Delta t$ using a variety of information in the calculation condition setting file and the input initial data.

As illustrated in FIG. 2, the processing that is carried out by the computation part 12 of the simulation apparatus 10 can be classified into preprocessing and main processing.

The preprocessing is defined as processing in which data generation processing for simulation data (step S101) and parameter calculation processing (step S102) are carried out in this order.

The generation processing for simulation data which is carried out in step S101 is defined as processing of generating "simulation data for treating wall surfaces of each building, ground and the like in the simulation target space as surface elements and for treating each tree in the simulation target space as one or more volume elements having permeability" from the input structure specifying data.

The simulation data generated by the generation processing for simulation data can be any data as long as information (shape of each of surface/volume elements and their positions in the simulation target space) that is required to calculate view factors (which will be described later on) can be specified based on it. Accordingly, the simulation data can be, for example, the data that contains "data consisting of a serial number, a coordinate number of the corresponding calculation lattice in the simulation target space, a direction wherein the corresponding surface element is directed or a flag indicating that the corresponding element is a volume element, a flag indicating whether the corresponding element is canopy, etc." for every surface/volume element.

The parameter calculation processing carried out in step S102 is defined as processing of calculating various parameters that is used in the main processing, based on the simulation data generated by data generation processing for simulation data.

The parameters calculated in the parameter calculation processing includes: view factor F related to each two elements (surface/volume elements); effective surface area $<A^{eff}>_k$ of each volume element k; sky factor $\omega_i$ of each element i, shadow factor $D_i$ of each surface element i, effective shadow factor $D^{eff}_k$ of each volume element k.

To begin with, the view factor F related to each two elements that is calculated in the parameter calculation processing will be described.

In the parameter calculation processing, for every combination of two surface elements i, j, "view factor $F_{ij}$ in viewing surface element j from surface element i" and "view factor $F_{ji}$ in viewing surface element i from surface element j" are calculated. Further, for every combination of surface element i and volume element k, "view factor $F_{ik}$ in viewing volume element k from surface element i" and "view factor $F_{ki}$ in viewing surface element i from volume element k" are calculated. Moreover, for every combination of two volume element k and l, "view factor $F_{kl}$ in viewing volume element l from volume element k" and "view factor $F_{lk}$ in viewing volume element k from volume element l" are calculated.

The "view factor $F_{ij}$ in viewing surface element j from surface element i" and "view factor $F_{ji}$ in viewing surface element i from surface element j", which are calculated in the parameter calculation processing, are the values defined by the following expressions (1) and (2), respectively.

$$F_{ij} = \frac{1}{A_i} \int_{Ai}\int_{Aj} \frac{T_{ij}\cos\beta_i\cos\beta_j}{\pi r^2} dA_i dA_j \quad (1)$$

$$F_{ji} = \frac{1}{A_j} \int_{Ai}\int_{Aj} \frac{T_{ij}\cos\beta_i\cos\beta_j}{\pi r^2} dA_i dA_j \quad (2)$$

Figure 3:
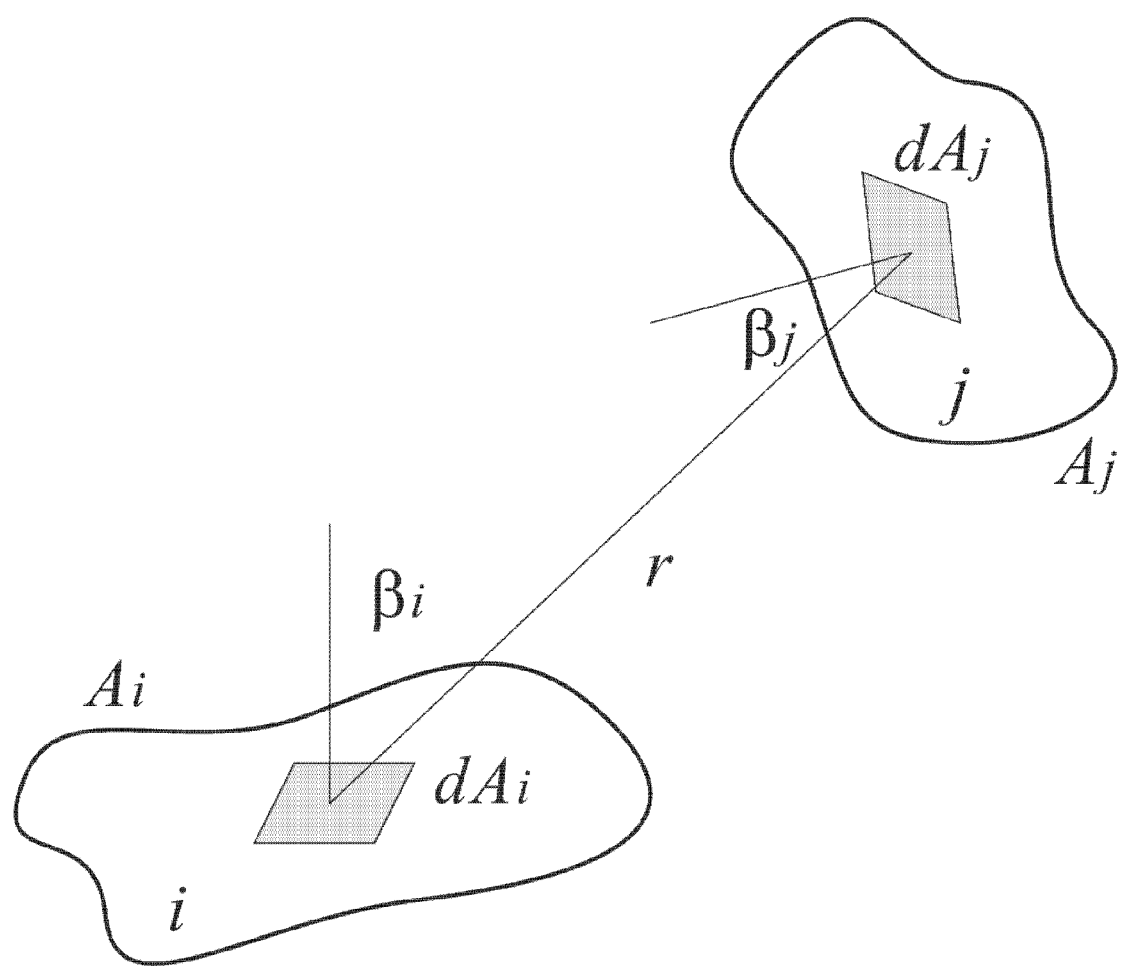
FIG. 3 is an explanatory diagram for parameters in a calculation expression for a view factor related to two surface elements.

In these expressions, $A_i$ and $A_j$ are the area of the surface element i and the area of the surface element j, respectively. As schematically illustrated in FIG. 3, $\beta_i$ is the angle that a straight line connecting an infinitesimal area $dA_i$ with an infinitesimal area $dA_j$ forms with a nominal vector of the infinitesimal area $dA_i$, and $\beta_j$ is the angle that the above straight line forms with a nominal vector of the infinitesimal area $dA_j$. Further, r is distance between the infinitesimal area $dA_i$ and the infinitesimal area $dA_j$.

$T_{ij}$ is permeability between the surface element i and the surface element j. $T_{ij}$ is calculated by the next expression using optical thickness $\tau_{ij}$ between two infinitesimal areas $dA_i$ and $dA_j$.

$T_{ij}=\exp(-\tau_{ij})$

Further, in cases where canopies are distributed between the surface element i and the surface element j (between the infinitesimal area $dA_i$ and the infinitesimal area $dA_j$), optical thickness $\tau_{ij}$ is calculated by the next expression using dispersion coefficient $k_{ext}$ of the canopy and leaf area density a.

$\tau_{ij}=\int_0^r k_{ext} a\, dr$

Though specific calculation procedure of view factors will be mentioned later on, the view factors that are defined by expressions (1) and (2) satisfy reciprocity relation. Namely, there exits the following relation among the view factor $F_{ij}$, the view factor $F_{ji}$, the area $A_i$ and the area $A_j$.

$A_i F_{ij} = A_j F_{ji}$

Consequently, it is possible to calculate the $F_{ji}$ from $F_{ij}$ calculated by the expression (1), $A_i$ and $A_j$, and it is also possible to calculate $F_{ij}$ from $F_{ji}$ calculated $F_{ij}$ by the expression (2), $A_i$ and $A_j$.

The "view factor $F_{ik}$ in viewing volume element k from the surface element i" that is calculated in the parameter calculation processing is a value defined by the following expression (3).

$$F_{ik} = \frac{1}{A_i} \int_{Ai}\int_{Ak} \frac{T_{ik}\cos\beta_i}{\pi r^2} dA_i dA^{eff}_{k\leftarrow i} \quad (3)$$

Figure 4:
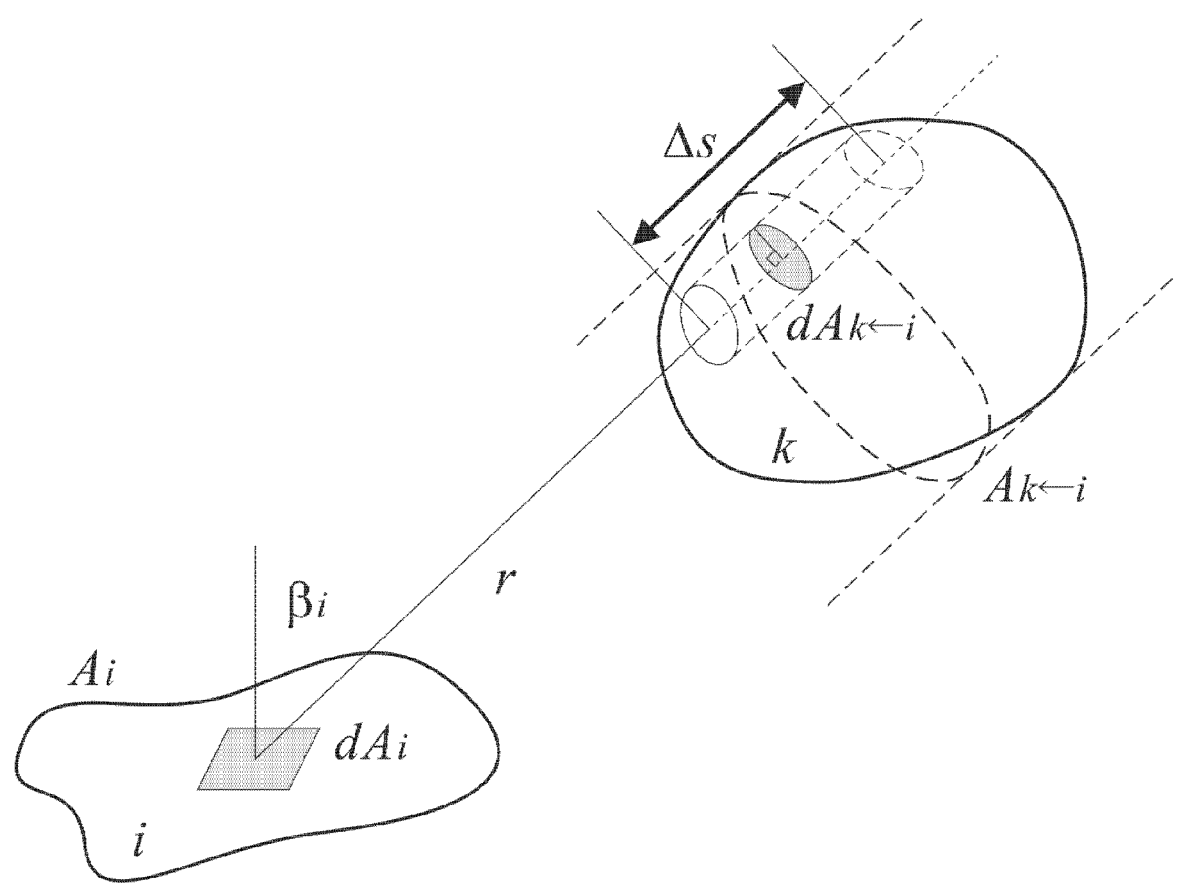
FIG. 4 is an explanatory diagram for parameters in a calculation expression of a view factor from a surface element to a volume element.

$\beta i$ in this expression (3) is, as schematically illustrated in FIG. 4, the angle that a straight line connecting an infinitesimal area $dA_i$ o the surface element Ai with an infinitesimal projected area $dA_{k\leftarrow i}$ forms with a nominal vector of the infinitesimal area $dA_i$. Further, r is distance between infinitesimal area $dA_i$ and infinitesimal projected area $dA_{k\leftarrow i}$i.

$A^{eff}_{k\leftarrow i}$ is an effective area of the volume element k, which is viewed from the surface element $A_i$ and is determined taking a shield factor of the volume element k itself into consideration. The $A^{eff}_{k\leftarrow i}$ is calculated by the next expression.

$A_{k\leftarrow i}^{eff}=\int_{Ak}dA_{k\leftarrow i}^{eff}=\int_{Ak}[1-\exp(-\Delta\tau_{k\leftarrow i})]dA_{k\leftarrow i} \quad (4)$ Here, $\Delta\tau_{k\leftarrow i}$ is optical thickness of the volume element k in the direction perpendicular to the infinitesimal projected area $dA_{k\leftarrow i}$ (see FIG. 4). In the case where the volume element k is a tree, $\Delta\tau_{k\leftarrow i}$ is calculated by the following expression, using the dispersion coefficient $k_{ext}$, the leaf area density a and $\Delta s_{k\leftarrow i}$ which is a geometric thickness of the volume element k in the direction perpendicular to $dA_{k\leftarrow i}$.

$\Delta\tau_{k\leftarrow i}=k_{ext}a\Delta s_{k\leftarrow i}$

In brief, the above expression (3) is an expression that can be rearranged, using the expression (4), as follows. In the parameter processing, the view factor $F_{ik}$ in viewing the volume element k from the surface element i is calculated according to the following expression (5).

$$F_{ik} = \frac{1}{A_i} \int_{Ai} \int_{Ak} \frac{T_{ik}\cos\beta_i}{\pi r^2}[1 - \exp(-\Delta\tau_{k<i})]dA_i dA_{k<i} \quad (5)$$

The "View factor $F_{ki}$ in viewing surface element i from volume element k" calculated in the parameter calculation processing is a value defined by the next expression.

$$F_{ki} = \frac{1}{A_{k\leftarrow i}^{eff}} \int_{Ai} \int_{Ak} \frac{T_{ik}\cos\beta_i}{\pi r^2}[1 - \exp(-\Delta\tau_{k<i})]dA_i dA_{k<i} \quad (6)$$

In other words, as the view factor $F_{ki}$ in viewing the surface element i from the volume element k, a value that satisfies reciprocity relation represented by the following expression is calculated.

$$A_i F_{ik} = A_{k\leftarrow i}^{eff} F_{ki}$$

The "view factor $F_{kl}$ in viewing volume element l from volume element k" calculated in the parameter calculation processing is a value defined by the next expression.

$$F_{kl} = \quad (7)$$
$$\frac{1}{A_{k\leftarrow l}^{eff}} \int_{Al} \int_{Ak} \frac{T_{kl}}{\pi r^2}[1 - \exp(-\Delta\tau_{l\leftarrow k})][1 - \exp(-\Delta\tau_{k\leftarrow l})]dA_{l\leftarrow k}dA_{k\leftarrow l}$$

That is, the view factor $F_{kl}$ is a view factor determined taking into consideration shield factor of the volume element k ("$1-\exp(-\Delta\tau_{k\leftarrow l})$"), shield factor of the volume element l ("$1-\exp(-\Delta\tau_{l\leftarrow k})$") and permeability $T_{kl}$ between the volume elements k and l.

Here, the view factors related to the volume elements represented by the expression (7), as with the view factors related to the surface elements, satisfy the following reciprocity expression.

$$A_{k\leftarrow i}^{eff} F_{kl} = A_{l\leftarrow k}^{eff} F_{lk}$$

Therefore, it is possible to calculate both of view factors related to two volume elements according to the expression (7), and it is also possible to calculate one of the view factors according to the expression (7) and to calculate the other of the view factors from the calculation result of the one of the view factors.

In the parameter calculation processing, each view factor mentioned above is calculated by the Monte Carlo method.

Namely, when calculating the view factor, processing of calculating μ and φ by the following expressions using uniform random numbers Rθ and Rφ in the range from 0 to 1 and of generating unit vectors n represented by the following expression is repeated by the number of times corresponding to the accuracy required for the view factor.

$$n = (\mu \cos\phi, \mu \sin\phi, \sqrt{1-\mu^2})$$

$$\mu^2 = R_\theta$$

$$\phi = 2\pi R_\phi$$

In other words, when calculating the view factor, processing of generating unit vectors n indicating travel directions of a large number of photons that are emitted from the surface element (or volume element) in accordance with Lambert's cosine law is performed.

Then, the view factor $F_{ij}$ is determined by integrating energy $W_p$ of every photons p that are to be incident on the element i when photons with same energy $W_0$ are emitted from the element i in the direction of every unit vector n.

Specifically, in the case where the number of the photons emitted from the surface element i is N and the number of the photons that are incident on the surface element j is n, the view factor $F_{ij}$ is calculated by the following expression.

$$F_{ij} = \frac{\sum_{p=1}^{n} W_p}{NW_0}$$

Here, in the case where there exist only the surface elements, having perfect shielding property, such as building wall surfaces, the energy $W_p$ of the photon to be incident on the surface element j agrees with $W_0$, and hence the view factor is given by $F_{ij}=n/N$. In the case where elements having radiation permeability, such as trees, are distributed in the space, the energy $W_p$ of the photon to be incident on the surface element j attenuates until arriving at the surface element j from the surface element i. Therefore the influence on the view factor due to the attenuation is taken into consideration by attenuating the energy of the photon. That is, $W_p$ is calculated by the next expression.

$$W_p = T_{ij,p} W_o$$

Here, $T_{ij,p}$ is permeability along the path of the photon p. Incidentally, it is also possible to calculate the view factor in consideration of the influence due to attenuation by decreasing the number of the photon to be incident on the surface element j based on the thinking that photons are shielded probabilistically.

The view factor $F_{ik}$ in viewing the volume element k from surface element i is a value defined as by the expression (7). Consequently, the view factor $F_{ik}$ in viewing the volume element k from the surface element i is calculated by the next expression.

$$F_{ik} = \frac{\sum_{p=1}^{n} W_p[1 - \exp(-\Delta\tau_{k\leftarrow i,p})]}{NW_0}$$

Here, $\Delta\tau_{k\leftarrow i,p}$ is optical thickness in the volume element k along the path of the photon p. N is the number of the photons emitted from the surface element i, and n is the number of the photons that are incident on the volume element k.

In the calculation of the view factor $F_{ki}$, it is assumed that photos are emitted isotropically from each point of the surfaces of the volume element. That is, a large number of photons are virtually emitted from each point of the surfaces of the volume element according to Lambert's cosine law.

Then, the view factor $F_{ki}$ in viewing the surface element i from the volume element k is calculated by the next expression.

$$A_{k\leftarrow i}^{eff} F_{ki} = \frac{\sum_{p=1}^{n} W_p[1 - \exp(-\Delta\tau_{k\leftarrow i,p})]}{(M/S_k)W_0}$$

Here, $\Delta\tau_{k\leftarrow i,p}$ is optical thickness within the volume element k which is calculated by back-tracing the photon p from its emitting point in the direction opposite to the traveling direction of the photon p. Further, $S_k$ is the surface area of the volume element k, M is the number of the photons emitted from the volume element k, and m is the number of the photons that are incident on the surface element i.

Similarly, the vie factor $F_{kl}$ in viewing the volume element l from volume element k is calculated by the next expression.

$$A^{eff}_{k \leftarrow l} F_{kl} = \frac{\sum_{p=1}^{n} W_p [1 - \exp(-\Delta \tau_{k \leftarrow l,p})][1 - \exp(-\Delta \tau_{l \leftarrow k,p})]}{(M/S_k)W_0}$$

Here, m in this expression is the number of the photons that are incident on the volume element l when M number of photons are emitted from the volume element k.

Hereinafter, it will be described effective surface area $<A^{eff}>_k$ of each volume element k, sky rate $\overline{\omega}_i$ of each element i, shadow factor $D_i$ of each surface element i, effective shadow factor $D^{eff}_k$ of each volume element k, which are calculated in the parameter calculation processing.

The effective surface area $<A^{eff}>_k$ of each volume element k which is calculated in the parameter calculation processing is a value defined by the following expression.

$$\langle A^{eff} \rangle_k = \sum_{i=1}^{m} A^{eff}_{k \leftarrow i} F_{ki}$$

In this expression, m is the total number of the elements (surface element or volume element) which exist around the volume element k (which can be seen from the volume element k), and i (=1 to m) is the element number of the surface element or the volume element which exists around the volume element k.

In the parameter calculation processing, the effective surface area $<A^{eff}>_k$ is calculated by the following expression.

$$\langle A^{eff} \rangle_k = \frac{S_k}{M} \sum_{p=1}^{M} [1 - \exp(-\Delta \tau_{k \leftarrow p})]$$

Namely, the effective surface area $<A^{eff}>_k$ is also calculated by Monte Carlo method.

The sky factor $\omega_i$ of the element (surface element/volume element) i is a value corresponding to the view factor in viewing the sky from the element i. The sky factor $\omega_i$ is calculated by a procedure similar to the procedure for the view factor in viewing a surface element from the element i.

The shadow factor $D_i$ of the surface element i is determined by integrating energy $\Delta W_p$ that is lost when the photon p which is emitted from the surface element i to the solar side is incident on other elements. More specifically, the shade rate $D_i$ is calculated by using Monte Carlo method and the following expression.

$$D_i = \frac{\sum_{p=1}^{N} \Delta W_p}{NW_0}$$

Note that, in the above expression, N is the number of photons emitted from the surface element i.

Similarly, the effective shade factor $D^{eff}_k$ of the volume element k is calculated by using Monte Carlo method and the following expression.

$$D^{eff}_k = 1 - \sum_{p=1}^{M} \frac{[1 - \exp(-\Delta \tau_{k \leftarrow p})] \cos\theta}{M/S_k} + \sum_{p=1}^{M} \frac{[1 - \exp(-\Delta \tau_{k \leftarrow p})] \cos\theta \Delta W_p}{(M/S_k)W_0}$$

The effective shade factor $D^{eff}_k$ and the shade factor $D_i$ are parameters of which values vary depending on the solar position. Therefore, in the parameter calculation processing, the shade factor $D_i$ and the effective shade factor $D^{eff}_k$ at each simulation time in the simulation target time range are calculated.

Hereinafter, a content of the main processing carried out by the computation part 12 will be described.

The main processing carried out by the computation part 12 is processing in which calculation processing for radiation flux and the like (step S201) and temperature calculation processing (step S202) are repeated as many times as the time step total number Nt. Here, the time step total number Nt may be determined based on the simulation target time range and a time stride ☐t. The time step total number Nt can be set by setting the time step total number Nt itself or the simulation target time range and the time stride Δt into the calculation condition setting file or by inputting it using the input device 20.

The radiation heat calculation processing carried out in step S201 is processing of calculating radiation flux $G_{L,i}$[W/m²] of the longwave radiation (infrared ray) by using parameters (the view factors, etc.) calculated by the parameter calculation processing, and of calculating net radiation heat $R_{S,i}$[W] related to the shortwave radiation and net radiation heat $R_{L,i}$[W] related to the longwave radiation which are absorbed by each element i by using the calculated radiation flux, Specifically, regarding radiation fluxes $G_{S,i}$, $G_{L,i}$ [W/m²] emitted from each element i, the following expressions (8) and (9) are fulfilled, respectively.

$$\langle A^{eff} \rangle_i G_{S,i} = \alpha_{S,i} \left\{ A^{eff}_{i \leftarrow Solar} S_{direct,i} + A^{eff}_{i \leftarrow sky} S_{diffuse,i} + \sum_{j=1}^{n} A^{eff}_{i \leftarrow j} F_{ij} G_{S,j} \right\} \quad (8)$$

$$\langle A^{eff} \rangle_i G_{L,i} = \langle A^{eff} \rangle_i \varepsilon_i B(T_i) + \alpha_{L,i} \left\{ A^{eff}_{i \leftarrow sky} L_i + \sum_{j=1}^{n} A^{eff}_{i \leftarrow j} F_{ij} G_{L,j} \right\} \quad (9)$$

Here, n in the expressions (8) and (9) is the total number of the surface elements and the volume elements. In the case where the element i is a volume element, $<A^{eff}>_i$ is effective surface area of the volume element i, and in the case where the element i is a surface element, it is area of the surface element i.

$\alpha_{S,i}$ and $\alpha_{L,i}$ are reflectivities of the element i for shortwave radiation and longwave radiation, respectively, and $\varepsilon_i$ is emission rate of the volume element i. $S_{direct,i}$ is direct shortwave radiation flux from the solar which is incident on element i, and $S_{diffuse,i}$ is radiation flux of atmospheric diffuse shortwave radiation which is incident on the element i. Li is radiation flux of the atmospheric longwave radiation which is incident on the element i, and $A^{eff}_{i\leftarrow Solar}$ and $A^{eff}_{i\leftarrow sky}$ are effective areas of the element i in the directions toward the solar and the sky, respectively.

$B(T_i)$ is radiation flux emitted from the element i by heat radiation. In cases where only the $G_{L,j}$ mentioned above is calculated (where radiation fluxes related to the longwave radiation are not calculated for each wavelength range), $B(T_i)$ is calculated by the next expression using StefanBoltzmann constant $\sigma$.

$$B(T) = \sigma T^4$$

$$\begin{bmatrix} D_{11} - \langle A^{eff}\rangle_1/\alpha_{S,1} & D_{12} & \cdots & D_{1n} \\ D_{21} & D_{22} - \langle A^{eff}\rangle_2/\alpha_{S,2} & \cdots & D_{2n} \\ \vdots & \vdots & \ddots & \vdots \\ D_{n1} & D_{n2} & \cdots & D_{nn} - \langle A^{eff}\rangle_n/\alpha_{S,n} \end{bmatrix} \begin{bmatrix} G_{S,1} \\ G_{S,2} \\ \vdots \\ G_{S,n} \end{bmatrix} = \begin{bmatrix} A^{eff}_{1\leftarrow Solar}S_{direct,1} + A^{eff}_{1\leftarrow sky}S_{diffuse,1} \\ A^{eff}_{2\leftarrow Solar}S_{direct,2} + A^{eff}_{2\leftarrow sky}S_{diffuse,2} \\ \vdots \\ A^{eff}_{n\leftarrow Solar}S_{direct,n} + A^{eff}_{n\leftarrow sky}S_{diffuse,n} \end{bmatrix}$$

$$\begin{bmatrix} D_{11} - \langle A^{eff}\rangle_1/\alpha_{L,1} & D_{12} & \cdots & D_{1n} \\ D_{21} & D_{22} - \langle A^{eff}\rangle_2/\alpha_{L,2} & \cdots & D_{2n} \\ \vdots & \vdots & \ddots & \vdots \\ D_{n1} & D_{n2} & \cdots & D_{nn} - \langle A^{eff}\rangle_n/\alpha_{L,n} \end{bmatrix} \begin{bmatrix} G_{L,1} \\ G_{L,2} \\ \vdots \\ G_{L,n} \end{bmatrix} = \begin{bmatrix} \langle A^{eff}\rangle_1\varepsilon_1 B(T_1)/\alpha_{L,1} + A^{eff}_{1\leftarrow sky}L_1 \\ \langle A^{eff}\rangle_2\varepsilon_2 B(T_2)/\alpha_{L,2} + A^{eff}_{2\leftarrow sky}L_2 \\ \vdots \\ \langle A^{eff}\rangle_n\varepsilon_n B(T_n)/\alpha_{L,n} + A^{eff}_{n\leftarrow sky}L_n \end{bmatrix}$$

$$D_{ij} = A^{eff}_{i\leftarrow j}F_{ij} = A^{eff}_{j\leftarrow i}F_{ji} = D_{ji}$$

Here, since the emission rate $\varepsilon_i$ agrees with the absorption rate of the element i, "$1-\Delta_{L,i}$" can be used as the emission rate $\varepsilon_i$.

$$\varepsilon_i = 1 - \alpha_{L,i}$$

The expressions (8) and (9) described above are fulfilled for each i from 1 to n. That is, the following two linear matrix expressions are established.

In the calculation processing for radiation heat and the like, to begin with, the radiation fluxes $G_{S,i}$ and $G_{L,i}$ emitted from each element i are calculated by solving these linear matrix expressions.

Then, in the radiation heat calculation processing, net radiation heat $R_{S,i}$[W] related to the shortwave radiation and net radiation heat $R_{L,i}$[W] related to the longwave radiation, which are absorbed by each element i, are calculated by the following expressions (10) and (11), respectively.

$$R_{S,i} = A^{eff}_{i\leftarrow Solar}S_{direct,i} + A^{eff}_{i\leftarrow sky}S_{diffuse,i} + \sum_{j=1}^{n} A^{eff}_{i\leftarrow j}F_{ij}G_{S,j} - \langle A^{eff}\rangle_i G_{S,i} \quad (10)$$

$$= \langle A^{eff}\rangle_i \{G_{S,i}/\alpha_{S,i} - G_{S,i}\}$$

$$R_{L,i} = A^{eff}_{i\leftarrow sky}L_i + \sum_{j=1}^{n} A^{eff}_{i\leftarrow j}F_{ij}G_{L,j} - \langle A^{eff}\rangle_i G_{L,i} \quad (11)$$

$$= \langle A^{eff}\rangle_i [\{G_{L,i} - \varepsilon_i B(T_i)\}/\alpha_{L,i} - G_{L,i}]$$

$S_{direct,i}$ and $S_{diffuse,i}$ are calculated by the following expressions, using the sky factor $\omega_i$ calculated by the parameter calculation processing, and the shade factor $D_i$ for the current simulation target time.

$$S_{direct,i} = c_{direct}\frac{\max[0, S \cdot n_i]}{S_z}(1-D_i)S^{\downarrow}$$

$$S_{diffuse,i} = c_{diffuse}\omega_i S^{\downarrow}$$

Here, $S^{\downarrow}$ is the solar radiation flux which is incident on horizontal plane downward, and S (=(Sx,Sy,Sz)) is solar direction vector. $n_i$ is the unit normal vector of the surface element i, and $c_{direct}$ and $c_{diffuse}$ are coefficients for separating diffuse and direct components.

$S_{direct,i}$ calculated by the above expression is $S_{direct,i}$ of the surface element i. $S_{direct,i}$ of the volume element i is calculated by a next expression, using the effective shade factor $D^{eff}_i$ for the current simulation target time, which has been calculated by the parameter calculation processing.

$$A_{i\leftarrow solar}^{eff}S_{direct,i} = c_{direct}(1-D_i^{eff})S^{\downarrow}$$

The temperature calculation processing (FIG. 2; step S202) is processing of calculating the surface temperature of each part in the simulation target space. The calculation procedure of the temperature of each surface element in the temperature calculation processing is same as a general calculation procedure except that the radiation heats are calculated using the view factors calculated by treating each canopy as a volume element having permeability. Therefore, only the calculation procedure of the temperature of the canopies (volume elements) will be discussed.

Figure 5:
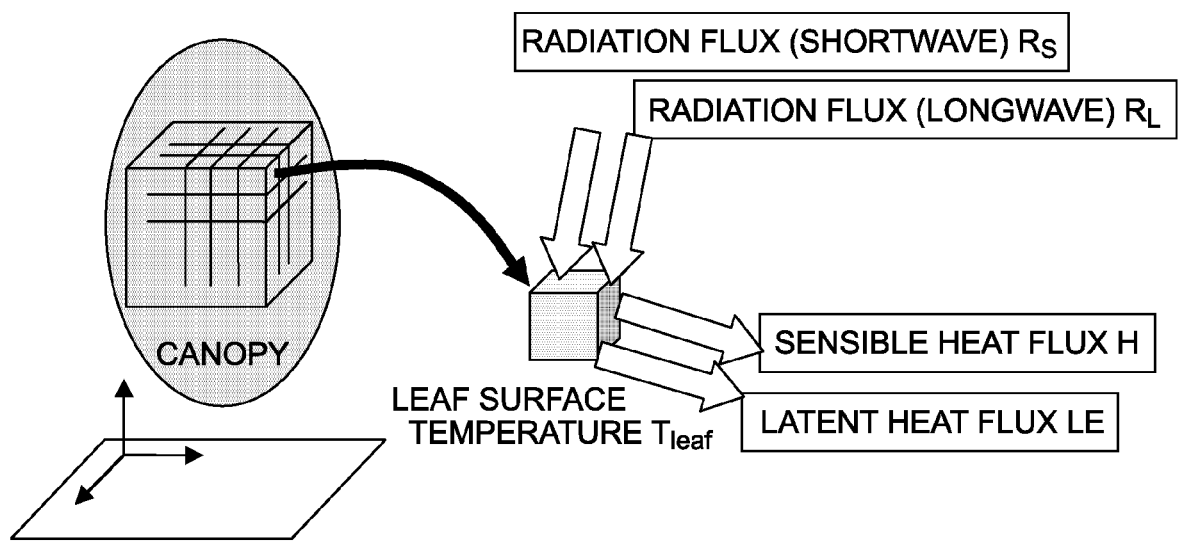
FIG. 5 is an explanatory diagram for heat balance of the volume element.

As schematically illustrated in FIG. 5, the radiation heat flux $R_S$ of the shortwave radiation and the radiation heat flux $R_L$ of the longwave flow into a volume element which is a part of the canopy, and from the volume element, the sensible heat flux H and the latent heat flux $L_E$ flow out. Therefore, the heat balance related to the volume element i, which is a canopy, is represented by the following expression.

$$Ca_i V_i \frac{dT_{leaf,i}}{dt} = R_{S,i} + R_{L,i} - H_i - LE_i$$

Here, $T_{leaf,i}$ is surface temperature [K] of the leaves in the element i, and $a_i$ is area density [m²/m³] of the leaves in the element i. $V_i$ is volume [m³] of element i, and C is thermal capacity [J/K/m²] of the leaf per unit leaf area. $R_{S,i}$ and $R_{L,i}$ are net radiation heat (strength of the radiation heat flux) [W] of the shortwave radiation and net radiation heat [W] of the longwave radiation which are absorbed by the leaves, respectively, and L is evaporation latent heat [J/kg].

$H_i$ is sensible heat transport amount (intensity of the sensible heat flux) [W] released from the leaf to the atmosphere, and $E_i$ is water vapor amount [kg/s] transpired from the leaf to the atmosphere.

The sensible heat transport amount $H_i$ released from the leaf to the atmosphere and the water vapor amount $E_i$ transpired from the leaf to the atmosphere are calculated by the following expressions.

$$H_i = a_i V_i K_h (T_{leaf,i} - T_{air,i})$$

$$E_i = a_i V_i \beta K_w (f_{leaf,i} - f_{air,i})$$

Here, $T_{air,i}$ is atmosphere temperature [K] in the element i, $f_{air,i}$ is water vapor partial pressure [Pa] in the atmospheric within the volume element i, $f_{leaf,i}$ is saturated water vapor partial pressure [Pa] at the leaf surface in the volume element i, $K_h$ is convection heat transfer coefficient [W/m²/K], $K_w$ is convection water vapor transportation coefficient [kg/s/m²/Pa], and $\beta$ is evaporation efficiency.

In the temperature calculation processing, using the leaf surface temperature and the heat flux at the time step n, the leaf surface temperature $T_{leaf,i}$ at the time step n+1 after the lapse of the time stride $\Delta t$ is calculated.

Specifically, taking into consideration variations of net longwave radiation, latent heat transport amount and transpiration, the variation $\Delta T_{leaf,i}$ of the leaf surface temperature from the time step n to the time step n+1 is given by the following expression.

$$Ca_i V_i \frac{\Delta T_{leaf,i}}{\Delta t} = R_{S,i} + \left(R_{L,i} + \frac{\partial R_{L,i}}{\partial T_{leaf,i}} \Delta T_{leaf,i}\right) - \left(H_i + \frac{\partial H_i}{\partial T_{leaf,i}} \Delta T_{leaf,i}\right) - L\left(E_i + \frac{\partial E_i}{\partial T_{leaf,i}} \Delta T_{leaf,i}\right)$$

Consequently, the leaf surface temperature variation $\Delta T_{leaf,i}$ can be calculated by the next expression.

$$\Delta T_{leaf,i} = \frac{R_{S,i} + R_{L,i} - H_i - LE_i}{\frac{Ca_i V_i}{\Delta t} - \frac{\partial R_{L,i}}{\partial T_{leaf,i}} + \frac{\partial H_i}{\partial T_{leaf,i}} + L\frac{\partial E_i}{\partial T_{leaf,i}}}$$

In the temperature calculation processing, the leaf surface temperature variation $\Delta T_{leaf,i}$ is calculated, and then $T_{leaf,i}^{(n+1)}$ defined as the leaf surface temperature after the lapse of time $\Delta t$ is calculated by the following expression.

$$T_{leaf,i}^{(n-1)} = T_{leaf,i}^{(n)} + \Delta T_{leaf,i}$$

The temperature calculation processing is ended when calculation of temperature of each part and output of the calculated temperature of each part (storage of each calculated temperature into the storage device 14 in the embodiment) are finished. Then, when processing of the specified number of times is not yet completed, the calculation processing for radiation heat flux and the like is started again, and the main processing is ended when processing of the specified number of times is completed.

As described above, the simulation apparatus 10 according to the present embodiment treats each canopy as one or more volume elements having permeability, and calculates, as a view factor related to one surface element and one volume element (see expressions (5) and (6)), a view factor decreased by a value corresponding to a quantity of radiation heat passing through the one volume elements. Further, the simulation apparatus calculates, as a view factor related to two volume elements (see expression (7)), a view factor decreased by a value corresponding to a quantity of radiation heat passing through the two volume elements. Therefore, according to the simulation apparatus of the present invention, it is possible to satisfactorily simulating a radiation heat transport phenomenon in a three-dimensional space including canopies in such a manner that calculation of states in each canopy is not required (in other words, at low computing costs).

<<Modified Forms>>

The simulation apparatus 10 according to the embodiment described above can be modified into various forms. For example, the simulation apparatus 10 can be modified into an apparatus that does not treat the tree canopy as the volume element(s) (an apparatus that calculate radiation heat by treating surfaces of the tree canopy as surface elements). Further, the simulation apparatus 10 can be modified into an apparatus that calculates view factors without taking permeability T between two elements into consideration, and takes permeability between two elements into consideration when calculating radiation flux, etc. However, calculation of view factors in consideration of permeability T between two elements usually gives more accurate result and enables to reduce calculation cost. Therefore, it is preferable to adopt the above view factors.

Further, since the canopy thermal capacity Ca is usually very small. it is possible to modify the simulation apparatus 10 into an apparatus that calculate the leaf surface temperature using "0" as Ca. Moreover, it is possible to modify the simulation apparatus 10 into an apparatus that uses a part or all of view factors as analytical solutions of their definition expressions.

The simulation apparatus 10 is a device that calculates the leaf temperature by Euler implicit method, but the simulation apparatus 10 can be modified into an apparatus that calculates the leaf temperature by the Crank-Nicholson method, which has second-order accuracy, or the apparatus calculating the leaf temperature by an explicit method. However, since accurate values can be obtained easily by using implicit method, it is preferable to adopt implicit method to calculate the leaf temperature.

EXPLANATION OF REFERENCE NUMERALS 10 simulation apparatus
12 computation part
14 storage part
16 interface circuit

The invention claimed is:

1. A simulation apparatus for simulating a radiation heat transport phenomenon, comprising:
 a view factor calculation means for calculating a view factor ($F_{kl}$) related to each pair of two elements (k, l) having corresponding surface areas ($A_k$, $A_l$) in a virtual three-dimensional space that is defined by a plurality of surface elements and a plurality of volume elements, the view factor calculation means calculating, as a view factor related to each pair of two elements including one or two volume elements, a view factor decreased by a value corresponding to a quantity of radiation heat passing through the one or two volume elements using an effective area ($A^{\it{eff}}$) and a shield factor including an optical thickness ($\tau$) based upon a geometric thickness of each volume element, a permeability ($T_{kl}$), and the distance (r) between the two elements, as indicated in the following equation:

$$F_{kl} = \frac{1}{A^{\it{eff}}_{k \leftarrow l}} \int_{Al} \int_{Ak} \frac{T_{kl}}{\pi r^2} [1 - \exp(-\Delta \tau_{l \leftarrow k})][1 - \exp(-\Delta \tau_{k \leftarrow l})] dA_{l \leftarrow k} dA_{k \leftarrow l};$$

a radiation heat quantity calculation means for repeatedly calculating a radiation heat quantity exchanged between each pair of two elements in the virtual three-dimensional space using each view factor calculated by the view factor calculation means, wherein the virtual three-dimensional space is defined by the plurality of surface elements and the plurality of volume elements so that a plurality of trees in the virtual three-dimensional space are treated as the plurality of volume elements such that each tree of the plurality of trees is separately represented as one or more volume elements of the plurality of volume elements, wherein the radiation heat quantity exchanged is provided for further use in a simulation of an urban environment.

2. The simulation apparatus according to claim 1, further comprising a temperature calculating means for calculating temperature of each element based on the radiation heat quantity calculated by the radiation heat quantity calculation means.

3. The simulation apparatus according to claim 2, wherein the temperature calculating means calculates the temperature of each element by implicit method.

4. A simulation method, executed by a computer, for simulating a radiation heat transport phenomenon, the method comprising:

a view factor calculation step of calculating a view factor ($F_{kl}$) related to each pair of two elements (k, l) having corresponding surface areas ($A_k$, $A_l$) in a virtual three-dimensional space that is defined by a plurality of surface elements and a plurality of volume elements in such manner that a plurality of trees are treated as the plurality of volume elements such that each tree of the plurality of trees is separately represented as one or more volume elements of the plurality of volume elements, the view factor calculation step calculating, as a view factor related to each pair of two elements including one or two volume elements, a view factor decreased by a value corresponding to a quantity of radiation heat passing through the one or two volume elements using an effective area ($A^{\it{eff}}$) and a shield factor including an optical thickness ($\tau$) based upon a geometric thickness of each volume element, a permeability ($T_{kl}$), and the distance (r) between the two elements, as indicated in the following equation:

$$F_{kl} = \frac{1}{A^{\it{eff}}_{k \leftarrow l}} \int_{Al} \int_{Ak} \frac{T_{kl}}{\pi r^2} [1 - \exp(-\Delta \tau_{l \leftarrow k})][1 - \exp(-\Delta \tau_{k \leftarrow l})] dA_{l \leftarrow k} dA_{k \leftarrow l};$$

a radiation heat quantity calculation step of repeatedly calculating a radiation heat quantity exchanged between each pair of two elements in the virtual three-dimensional space using each view factor calculated by the view factor calculation step, wherein the radiation heat quantity exchanged is further used in a simulation of an urban environment.

5. A non-transitory computer readable medium stored with a simulation program for simulating a radiation heat transport phenomenon, the program making a computer perform:

a view factor calculation step of calculating a view factor ($F_{kl}$) related to each pair of two elements (k, l) having corresponding surface areas ($A_k$, $A_l$) in a virtual three-dimensional space that is defined by a plurality of surface elements and a plurality of volume elements in such manner that a plurality of trees are treated as the plurality of volume elements such that each tree of the plurality of trees is separately represented as one or more volume elements of the plurality of volume elements, the view factor calculation step calculating, as a view factor related to each pair of two elements including one or two volume elements, a view factor decreased by a value corresponding to a quantity of radiation heat passing through the one or two volume elements using an effective area ($A^{\it{eff}}$) and a shield factor including an optical thickness ($\tau$) based upon a geometric thickness of each volume element, a permeability ($T_{kl}$), and the distance (r) between the two elements, as indicated in the following equation:

$$F_{kl} = \frac{1}{A^{\it{eff}}_{k \leftarrow l}} \int_{Al} \int_{Ak} \frac{T_{kl}}{\pi r^2} [1 - \exp(-\Delta \tau_{l \leftarrow k})][1 - \exp(-\Delta \tau_{k \leftarrow l})] dA_{l \leftarrow k} dA_{k \leftarrow l};$$

a radiation heat quantity calculation step of repeatedly calculating a radiation heat quantity exchanged between each pair of two elements in the virtual three-dimensional space using each view factor calculated by the view factor calculation step, wherein the radiation heat quantity exchanged is further used in a simulation of an urban environment.

* * * * *

UNITED STATES PATENT AND TRADEMARK OFFICE
CERTIFICATE OF CORRECTION

PATENT NO. : 10,796,034 B2
APPLICATION NO. : 15/036820
DATED : October 6, 2020
INVENTOR(S) : Keigo Matsuda et al.

It is certified that error appears in the above-identified patent and that said Letters Patent is hereby corrected as shown below:

In the Claims

At Column 15, Lines 15-17, " $F_{kl} = \frac{1}{A^{eff}_{k \leftarrow l}} \int_{Al} \int_{Ak} \frac{T_{kl}}{\pi r^2} [1 - \exp(-\Delta \tau_{l \leftarrow k})][1 - \exp(-\Delta \tau_{k \leftarrow l})] dA_{l \leftarrow k} dA_{k \leftarrow l};$ " should be -- $F_{kl} = \frac{1}{A^{eff}_{k \leftarrow l}} \int_{Al} \int_{Ak} \frac{T_{kl}}{\pi r^2} [1 - \exp(-\Delta \tau_{l \leftarrow k})][1 - \exp(-\Delta \tau_{k \leftarrow l})] dA_{l \leftarrow k} dA_{k \leftarrow l};$ and--.

At Column 16, Lines 8-10, " $F_{kl} = \frac{1}{A^{eff}_{k \leftarrow l}} \int_{Al} \int_{Ak} \frac{T_{kl}}{\pi r^2} [1 - \exp(-\Delta \tau_{l \leftarrow k})][1 - \exp(-\Delta \tau_{k \leftarrow l})] dA_{l \leftarrow k} dA_{k \leftarrow l};$ " should be -- $F_{kl} = \frac{1}{A^{eff}_{k \leftarrow l}} \int_{Al} \int_{Ak} \frac{T_{kl}}{\pi r^2} [1 - \exp(-\Delta \tau_{l \leftarrow k})][1 - \exp(-\Delta \tau_{k \leftarrow l})] dA_{l \leftarrow k} dA_{k \leftarrow l};$ and--.

At Column 16, Lines 46-48, " $F_{kl} = \frac{1}{A^{eff}_{k \leftarrow l}} \int_{Al} \int_{Ak} \frac{T_{kl}}{\pi r^2} [1 - \exp(-\Delta \tau_{l \leftarrow k})][1 - \exp(-\Delta \tau_{k \leftarrow l})] dA_{l \leftarrow k} dA_{k \leftarrow l};$ " should be -- $F_{kl} = \frac{1}{A^{eff}_{k \leftarrow l}} \int_{Al} \int_{Ak} \frac{T_{kl}}{\pi r^2} [1 - \exp(-\Delta \tau_{l \leftarrow k})][1 - \exp(-\Delta \tau_{k \leftarrow l})] dA_{l \leftarrow k} dA_{k \leftarrow l};$ and--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*